(12) United States Patent
Sone et al.

(10) Patent No.: US 6,552,344 B1
(45) Date of Patent: Apr. 22, 2003

(54) INFRARED DETECTOR AND METHOD OF MAKING THE INFRARED DETECTOR

(75) Inventors: Takanori Sone, Tokyo (JP); Tomohiro Ishikawa, Tokyo (JP); Yoshiyuki Nakaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/631,988

(22) Filed: Aug. 3, 2000

(30) Foreign Application Priority Data

Nov. 30, 1999 (JP) .............................. 11-339476

(51) Int. Cl.[7] .............................. G01J 5/02; H01L 27/14
(52) U.S. Cl. .................................. 250/338.1; 250/338.4
(58) Field of Search .................................. 250/338.1, 338.4, 250/332

(56) References Cited

U.S. PATENT DOCUMENTS

| | | | |
|---|---|---|---|
| 5,021,663 A | 6/1991 | Hornbeck | 250/349 |
| 5,286,976 A | 2/1994 | Cole | 250/349 |
| 6,031,231 A * | 2/2000 | Kimata et al. | 250/338.1 |
| 6,201,243 B1 * | 3/2001 | Jerominek | 250/338.1 |

FOREIGN PATENT DOCUMENTS

JP          10-209418          8/1998

* cited by examiner

*Primary Examiner*—Georgia Epps
*Assistant Examiner*—Richard Hanig
(74) *Attorney, Agent, or Firm*—Leydig, Voit & Mayer, Ltd.

(57) ABSTRACT

An infrared detector includes an optical cavity structure with an infrared reflection film on a semiconductor substrate. The infrared reflection film and an infrared absorption film provide high efficiency infrared detection.

20 Claims, 10 Drawing Sheets

INFRARED DETECTOR AND METHOD OF MAKING THE INFRARED DETECTOR

BACKGROUND OF THE INVENTION

1. Field of the Invention

The present invention relates to an infrared detector and, in particular, relates to a thermal infrared detector having a heat insulation structure section.

2. Background Art

FIG. 10 is a sectional view of an infrared detector disclosed in Japanese Patent Laid-Open No. 10-209418. In the infrared detector of FIG. 10, an insulating film 2, such as $SiO_2$ is formed on a silicon substrate 1. In the insulating film 2, there are a heat detection section 3, such as bolometer; and a metal wiring 4 connected to the heat detection section 3.

Further, the silicon substrate 1 below the heat detection section 3 is provided with a hollow section 6, thereby making a vicinity of the heat detection section 3 into a heat insulating structure section 7.

Above the heat detection section 3, there is provided a plate-like infrared absorption section 9 supported by a support section 5 such as $SiO_2$. The infrared absorption section 9 comprises an insulating layer 10, an infrared absorption film 11 on a surface of the insulating layer 10, and an infrared reflection film 12 on a rear surface of the insulation layer 10. Infrared light incident on the infrared detector is absorbed by the infrared absorption section 9 and thereby converted into heat, and is transmitted to the heat detection section 3 through the support section 5. In the heat detection section 3, a thermal change due to such a heat is detected. Thus, the incident of infrared light on the infrared absorption section 9 is detected. In the structure shown in FIG. 10, infrared absorption efficiency is increased by providing the infrared reflection film 12 on the rear surface of the insulation layer 10 to thereby reflect the infrared ray transmitted through the infrared absorption film 11 and causing it to come into the infrared absorption film 11 again.

However, in order to manufacture the infrared detector with high sensitivity, it is further necessary to increase the infrared absorption efficiency in the infrared absorption section 9. Contrary to this, it is known that the infrared absorption efficiency is increased by adopting an optical cavity structure in which an optical distance between the infrared absorption film 11 and the infrared reflection film 12 is set to one quarter of the center wavelength of the infrared light absorbed.

However, in order to make the infrared detector of FIG. 10 into an optical cavity structure, the thickness of the insulating layer 10 sandwiched between the infrared absorption film 11 and the infrared reflection film 12 must be on the order of 1 $\mu$m, so that the heat capacity of the infrared absorption section 9 becomes large. Therefore, the thermal time constant in heat detection section becomes large, so that there has been a problem that infrared detection following a rapid temperature change becomes impossible.

DISCLOSURE OF THE INVENTION

Accordingly, an object of the invention is to provide a high sensitivity infrared detector with no increase in heat capacity of the infrared absorption section, and to provide, in particular, a detector having an optical cavity structure.

This object and advantages of the invention are achieved by providing a novel and improved infrared detector, and the infrared detector is an infrared detector for detecting an absorbed infrared ray by converting it into heat, comprising: a semiconductor substrate having a heat insulation section; a heat detection section provided in the heat insulation section; an infrared absorption film disposed substantially parallel to a surface of the semiconductor substrate with a predetermined spacing being kept from the surface; and an infrared reflection film provided on the semiconductor substrate; wherein an infrared ray having transmitted through the infrared absorption film is reflected by the infrared reflection film and comes into the infrared absorption film again.

Further, according to one aspect of the invention, there is provided a method of producing an infrared detector for detecting an absorbed infrared ray by converting it into a heat, comprising the steps of forming, on a semiconductor substrate, a wiring layer and a heat detection section connected to the wiring layer, and covering them with an insulation film; forming an infrared reflection film on the insulation film; forming a sacrifice film on the infrared reflection film, and forming an opening portion in the sacrifice film above the heat detection section, thereby exposing the infrared reflection film; forming, on the sacrifice film, an infrared absorption section including an infrared absorption film; removing the sacrifice film; and forming, below the heat detection section, a hollow section by etching the semiconductor substrate.

Furthermore, according to another aspect of the invention, there is provided a method of producing an infrared detector for detecting an absorbed infrared ray by converting it into a heat, comprising the steps of forming a metal layer on a semiconductor substrate, and forming a wiring layer and an infrared reflection film separated from the wiring layer by patterning the metal layer; forming a heat detection section connected to the wiring layer, and covering it with an insulation film; forming a sacrifice film on the insulation film, and forming an opening portion in the sacrifice film above the insulation film, thereby exposing the insulation film; forming, on the sacrifice film, an infrared absorption section including an infrared absorption film; removing the sacrifice film; and forming, below the heat detection section, a hollow section by etching the semiconductor substrate.

The above object and novel features of the invention will more fully appear from the following detailed description when the same is read in connection with the accompanying drawings. It is to be expressly appear, however, that the drawings are for purpose of illustration only and are not intended as a definition of the limits of the invention.

Thus, as a result of intensive study, the inventors has found the fact that the infrared absorption efficiency can be increased without increasing the thermal time constant by means of forming an optical cavity structure by providing an infrared reflection film on a semiconductor substrate and using such an infrared reflection film and an infrared absorption film provided in an infrared detection section, and thereby the invention has been completed.

BEST MODE FOR CARRYING OUT THE INVENTION

Embodiment 1

Figure 1:
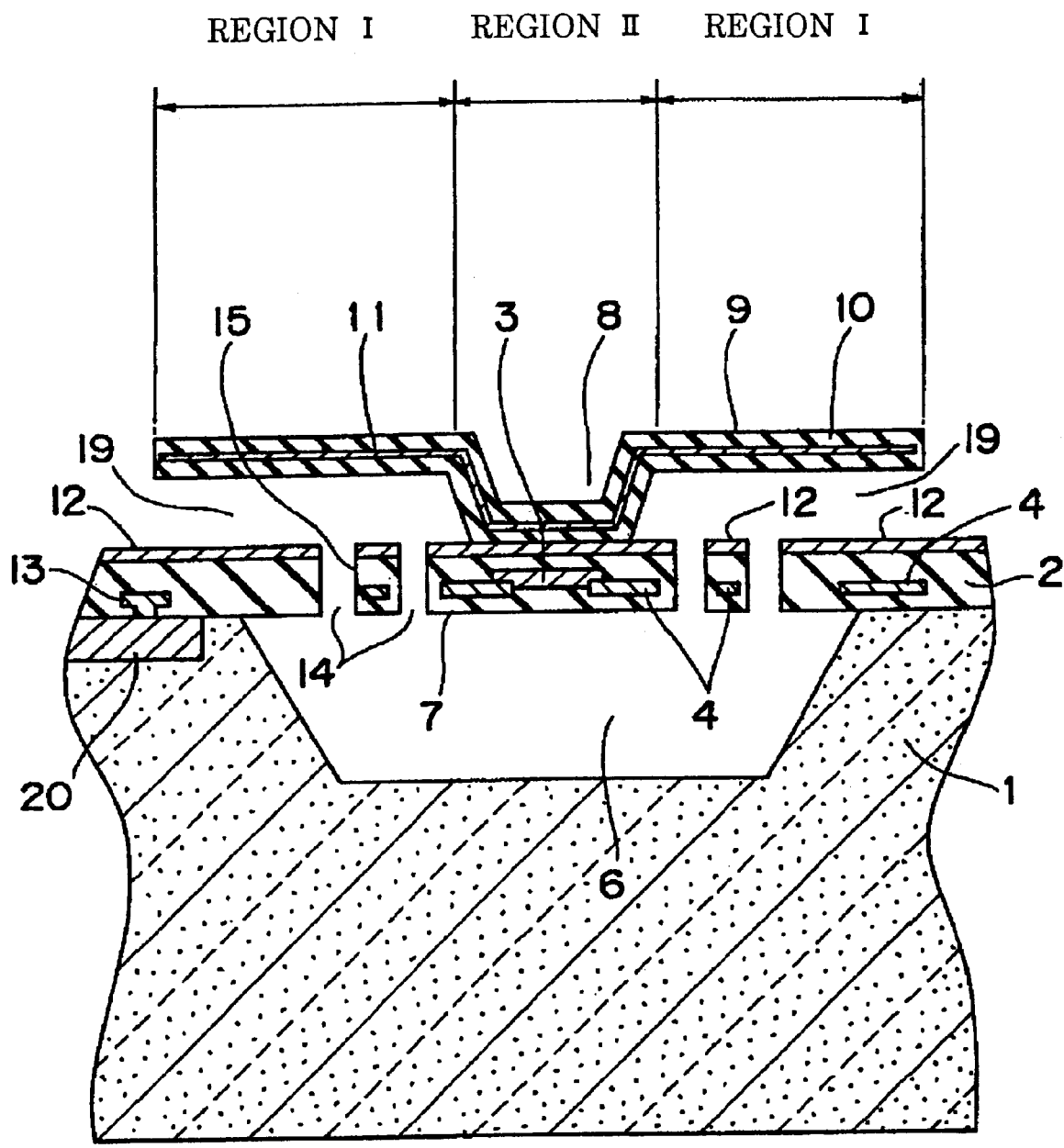
FIG. 1 is a sectional view of an infrared detector according to an embodiment 1 of the invention.
Figure 2:
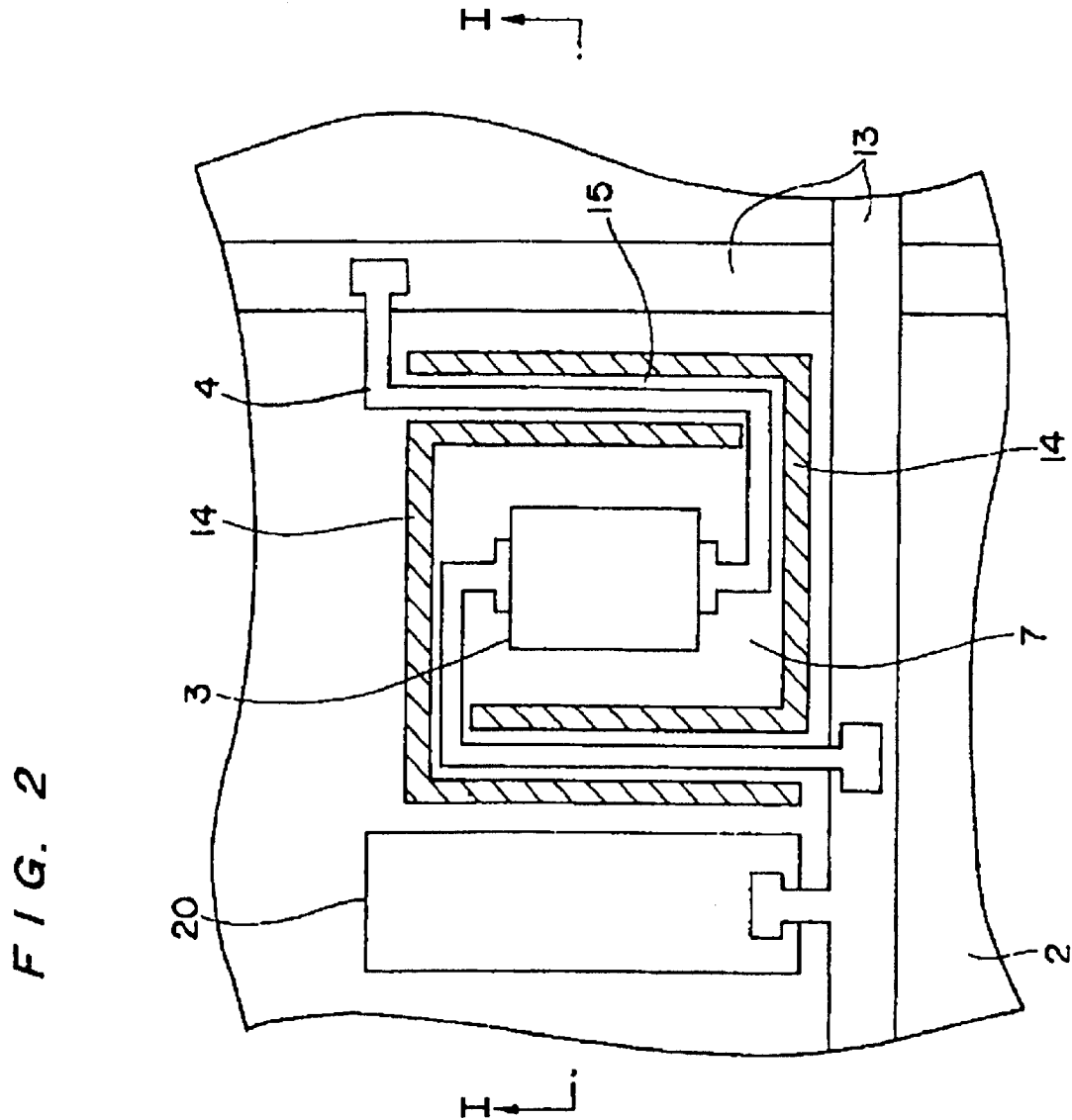
FIG. 2 is a top plan view of the infrared detector according to the embodiment 1 of the invention.
Figure 10:
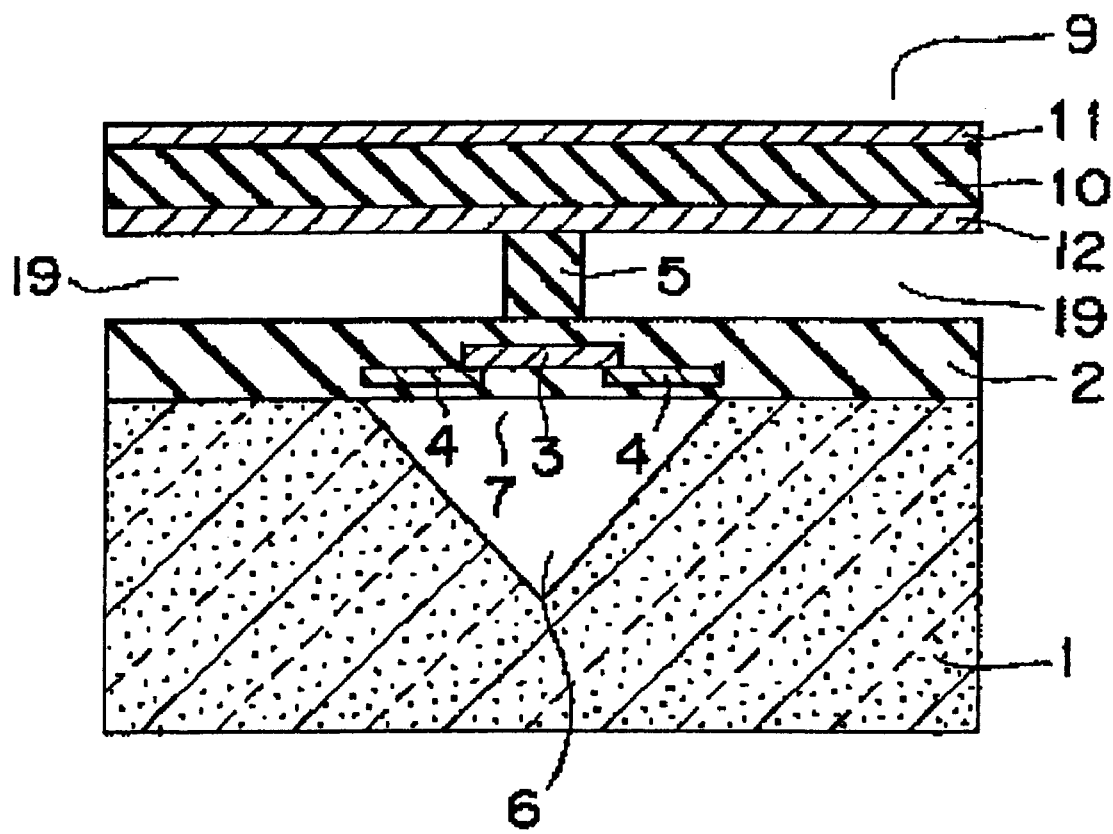
FIG. 10 is a sectional view of an infrared detector according to a conventional structure.

FIG. 1 is a sectional view of an infrared detector according to an embodiment 1 of the invention, and is a sectional view in a direction I—I of FIG. 2. In the drawing, a reference numeral identical with that in FIG. 10 represents an identical or corresponding portion. In the infrared detector according to this embodiment, the infrared reflection film 12, which is located on the rear surface of the infrared absorption section 9 in the structure of FIG. 10, is located on the insulating film 2 on the silicon substrate 1. In a region I, an optical distance between the infrared absorption film 11 and the infrared reflection film 12 is about one quarter of the center wavelength of the absorbed infrared light. That is, the infrared absorption film 11 and the infrared reflection film 12 form an optical cavity structure with an air layer 19 between those films. On the other hand, in a region II, since the optical distance between the infrared absorption film 11 and the infrared reflection film 12 is smaller than about one quarter of the center wavelength of the absorbed infrared light, a resonance structure is not formed.

The infrared absorption section 9 has a rectangular shape when viewed from above and, at its central part is convex to thereby form a support section 8. In this manner, by forming the infrared absorption section 9 with a spacing from the silicon substrate 1, the area of the infrared absorption section 9 can be enlarged, so that it is possible to increase the infrared absorption efficiency.

For the infrared reflection film 12 it is possible to use all kinds of metals, but it is preferable to use aluminum, titanium or its compounds, copper, gold or the like, each having a high infrared reflectance.

For the infrared absorption film 11, it is preferable to use a high resistance metal as a semitransparent film to infrared light, and thus it is preferable to use chromium, nichrome, titanium nitride, vanadium nitride or the like. If the infrared light is incident on such a metal, a part of the infrared light is transmitted therethrough, and the transmitted infrared light is reflected by the infrared reflection film 12 and comes back into the infrared absorption film 11 to be absorbed again. When the sheet resistance of the infrared absorption film 11 is 377 $\Omega/\square$, the infrared absorption efficiency of the optical cavity structure becomes maximum.

The infrared absorption film 11 is located between the insulating films 10 made of a material capable of transmitting infrared light such as, for example, $SiO_2$ or SiN in order to protect it from an external environment and make it independent as the infrared absorption section 9. The insulating film 10 suffices if it has a thickness sufficient to make the infrared absorption section 9 independent, so that it can be sufficiently thins to make its heat capacity small.

The infrared light absorbed by the infrared absorption film 11 is converted into heat, and the heat is transmitted to the heat detection section 3 through the support section 8. For the heat detection section 3, there is used, for example, a bolometer material, and here the heat is converted into an electric signal. The electric signal is sent to a circuit section 20 through the wiring layer 4 and an external electrode 13, and is detected.

Incidentally, as an infrared detection system, there may be used a thermopile system using an integrated pattern of thermocouples, a pyroelectric system with pyroelectric materials, or a silicon p-n junction, etc.

On the other hand, the heat insulation structure section 7 opposite the hollow section 6 is connected to the silicon substrate 1 by support legs 15 and is maintained thereby.

FIG. 2 is a top plan view of the infrared detector according to this embodiment. In FIG. 2, the infrared absorption film 11, the infrared reflection film 12 and the like are omitted, and an arrangement of the wiring layer 4, the heat insulation structure section 7, a circuit section 20 and the like is shown. Around the heat insulation structure section 7, slits 14 are formed by etching the silicon substrate 1 and the hollow section 6 (not shown in this drawing) is formed below the heat insulation structure section 7, and thus they are thermally insulated from the silicon substrate 1. The heat insulation structure section 7 is connected to the silicon substrate 1 by the support legs 15 and maintained thereby. Further, the heat detection section 3 is connected to the external wiring 13 by the wiring layer 4 on the support legs 15.

Figure 3:
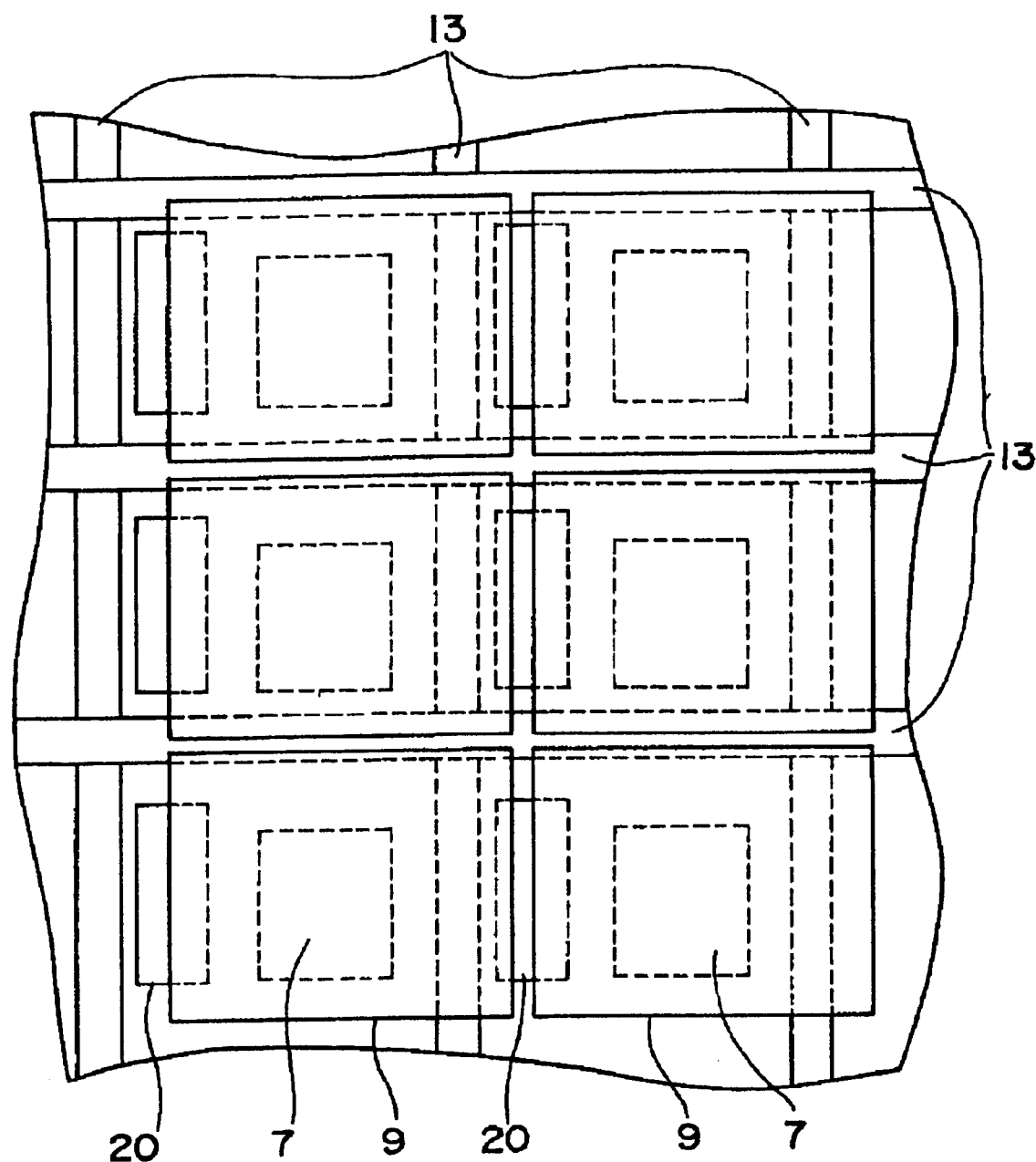
FIG. 3 is a top plan view of an array-like infrared detector according to the embodiment 1 of the invention.

FIG. 3 is a schematic view when an infrared detection device in which infrared detectors as shown in FIG. 1 are arranged in an array-like form is viewed from above. As apparent from FIG. 3, the infrared absorption section 9 extends above the external wiring 13 and the circuit section 20. Therefore, it is possible to use substantially the whole surfaces of the infrared detectors as the infrared absorption section 9, so that the infrared absorption efficiency can be increased.

Especially, in this embodiment, the optical distance between the infrared absorption film 11 and the infrared reflection film 12 is set to about one quarter of a center wavelength of the infrared light to be absorbed. Therefore, the infrared absorption film 11 and the infrared reflection film 12 have the optical cavity structure, so that the infrared ray reflected from the infrared reflection film 12 and exiting the infrared absorption film 11 will interfere with the infrared light reflected at the surface of the infrared absorption film 11 to negate each other, which results in a substantially reflection-free surface of the infrared absorption film 11 thereby further increasing the infrared absorption efficiency.

In this embodiment, the optical distance between the infrared absorption film 11 and the infrared reflection film 12 is set to about one quarter of a center wavelength of the infrared light to be absorbed, but it is possible to use an the optical distance other than this.

In such a constitution, the increase in absorption efficiency owing to the above-mentioned principle is low, but the absorption efficiency is increased by the fact the infrared light is reflected in multiple times between the infrared absorption film 11 and the infrared reflection film 12. That is, the infrared light reflected by the infrared reflection film 12 and having come into the infrared absorption film 11 again is partly absorbed, but a part thereof is reflected again. The infrared ray reflected again is reflected by the infrared reflection film 12, and further comes into the infrared absorption film 1. By such a multiple reflection, the infrared absorption efficiency is increased.

Incidentally, the "optical distance" means (refractive index of a medium)×(physical distance). That is, in case where there is another substance such as, for example, an insulating material between the infrared absorption film 11 and the infrared reflection film 12, the refractive index of such a material is also taken into consideration. For example, in FIG. 1, where a protective $SiO_2$ insulating film is formed on the infrared reflection film 12, the optical distance is calculated including this insulating film, so that the optical distance becomes shorter than where there is no insulating film.

The infrared detector according to this embodiment may be produced by (i) forming, on a semiconductor substrate 1, a wiring layer 4 and a heat detection section 3 connected to the wiring layer 4, (ii) covering them with an insulating film 2, (iii) forming an infrared reflection film 12 on the insulating film 2, (iv) forming a sacrificial film of silicon, polyimide or the like on the infrared reflection film 2, (v) forming an opening in the sacrificial film opposite the heat detection section 3, (vi) forming, over the sacrificial film, an infrared absorption section 9 including an infrared absorption film 11, (vii) removing the sacrificial film to form an optical cavity structure comprising the infrared absorption film 11 and the infrared reflection film 12 with an air layer 19 therebetween, and (viii) forming, below the heat detection section 3, a hollow section 6 by partially etching the semiconductor substrate 1.

In the step (iv), the thickness of the sacrificial film is selected such that an optical distance between the infrared reflection film 12 and the infrared absorption film 11 sandwiching the sacrificial film becomes about one quarter of a center wavelength of the infrared light to be absorbed by the infrared absorption film 11.

In the step (v), the opening in the sacrificial film is formed by etching a portion of the sacrificial film above the heat detection section 3. In one instance, the portion of the sacrificial film is fully removed to expose the infrared reflection film 12. In another instance, the portion of the sacrificial film is partially removed to leave some residual layer of the sacrificial film thereby providing a closed-bottom opening. The residual layer in the latter case is used to support the infrared absorption film 11 and is, therefore, kept during removal of the sacrificial film.

In the infrared detector according to this embodiment, the infrared reflection film 12 may be covered with a protective insulating film made, for example, of $SiO_2$, SiN in order to protect it from an external environment. Such an infrared detector may be prepared basically by the same steps as mentioned above except for an additional step of forming the protective insulating film after the step (v).

Embodiment 2

Figure 4:
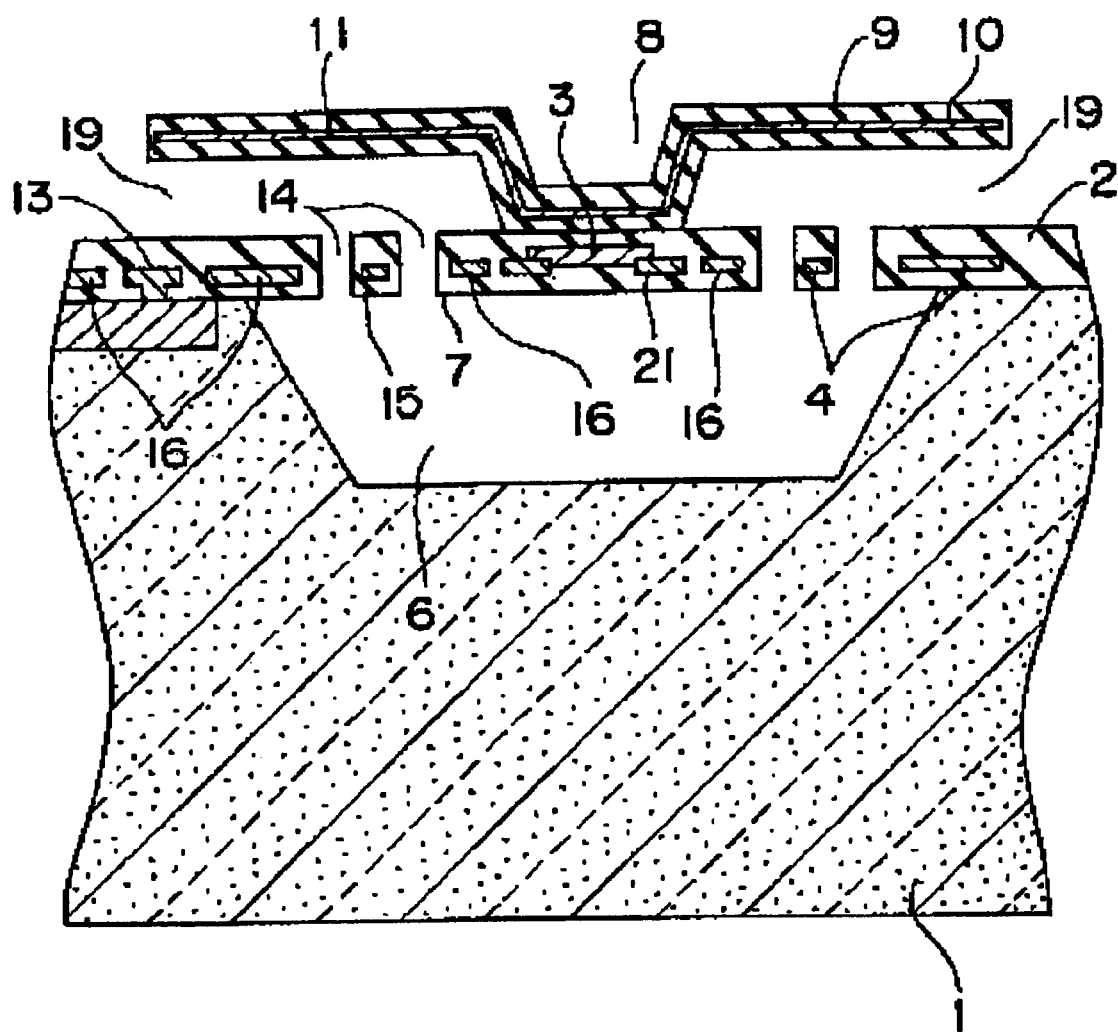
FIG. 4 is a sectional view of an infrared detector according to an embodiment 2 of the invention.
Figure 5:
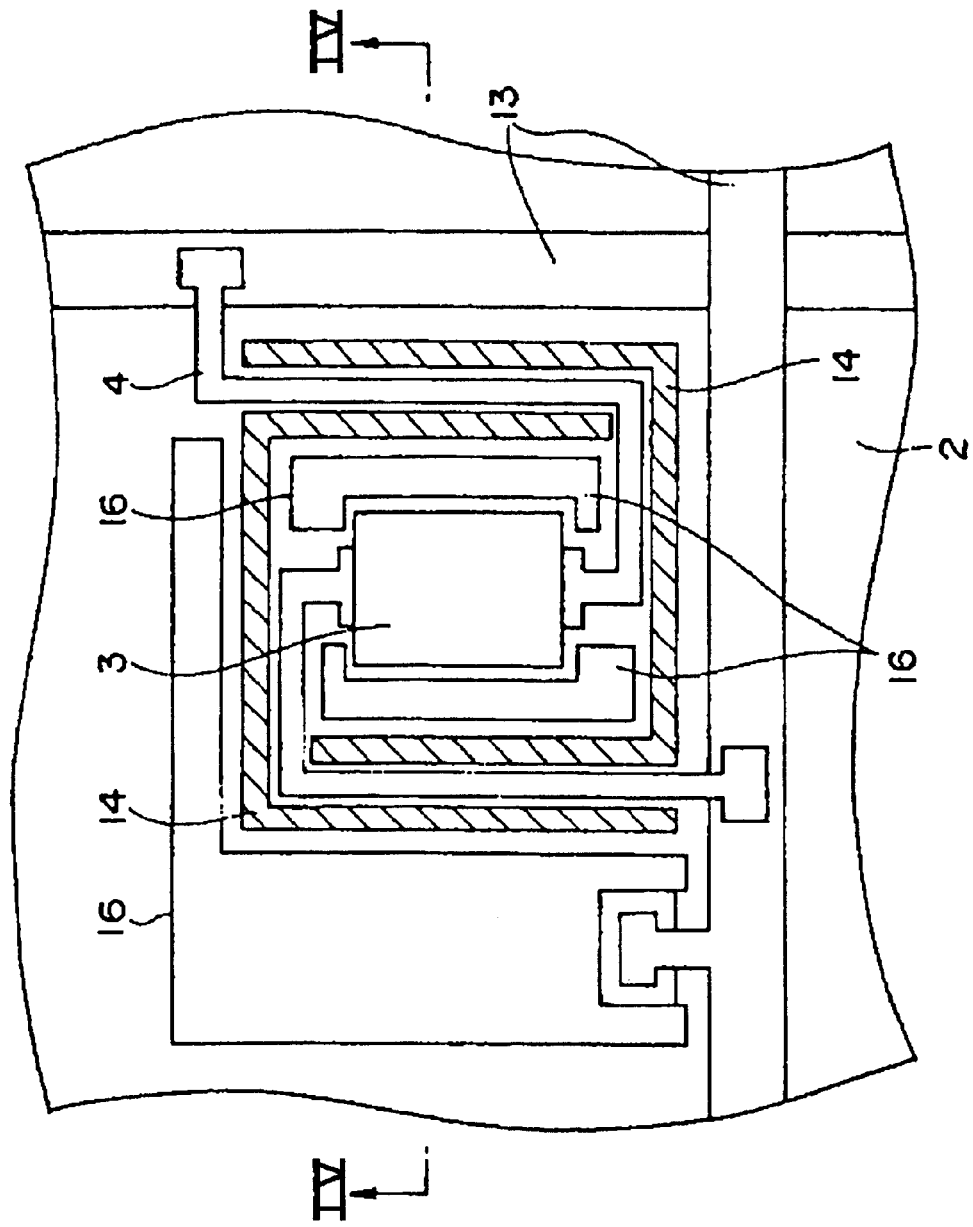
FIG. 5 is a top plan view of the infrared detector according to the embodiment 2 of the invention.

FIG. 4 is a sectional view of an infrared detector according to an embodiment 2 of the invention, and shows a sectional view in a direction IV—IV of FIG. 5. Further, FIG. 5 is a top plan view of an infrared detector according to an embodiment 2 of the invention. In FIG. 5, the infrared absorption section 9 and the like are omitted, and only an arrangement of the wiring layer 4, the heat insulation structure section 7, the circuit section 20 and the like is shown. In FIGS. 4 and 5, a reference numeral identical with that in FIG. 10 represents an identical or corresponding portion.

The infrared detector according to this embodiment differs from the structure of the embodiment 1 in a point that a metal layer formed simultaneously with the wiring layer 4 is used as an infrared reflection film 16. That is, since an area of regions forming the wiring layer 4 and the circuit section is small in comparison with a surface area of the silicon substrate 1, the infrared reflection film 16 is formed using a region other than the region forming the wiring layer 4 and the like.

In this embodiment, the infrared reflection film 16 consists, for example, of the same metal material as the wiring layer 4 and, further, is formed in the same step by a evaporation and the like. That is, after the insulation layer 2 of $SiO_2$ and the like has been formed on the silicon substrate 1, an electrode material layer of Al and the like is formed over the whole surface. Subsequently, the electrode material layer in unnecessary portions is removed using a photo resist mask and the like, thereby forming the wiring layer 4. In such a step, in the embodiment 1, the electrode material layer other than the wiring layer 4 has been all removed, but in the embodiment 2 the electrode material only in the wiring layer 4 and portions which are required to be removed for insulation are removed, and another portions are remained and made into the infrared reflection layer 16. In order to widen an area of the infrared reflection film 16, it is preferable that an area of such portions to be removed is made as small as possible.

In this manner, by using a structure according to this embodiment, since a step for forming the wiring layer 4 acts also as a step for forming the infrared reflection film 16, it becomes possible to simplify a manufacturing process.

Incidentally, in the structure according to this embodiment, since also a surface of the wiring layer 4 reflects the infrared ray, it follows that the wiring layer 4 functions also as the infrared reflection film.

Also in the infrared detector according to this embodiment, by setting the optical distance between the infrared absorption film 11 and the infrared reflection film 12 to about one quarter of center wavelength of the absorption infrared ray, it is possible to increase the infrared absorption efficiency.

Further, even in case where it is set to a distance other than that value, by the fact that the infrared ray is reflected in multiple times between the infrared absorption film 11 and the infrared reflection film 16, it is possible to improve the infrared absorption efficiency.

Embodiment 3

This embodiment relates to a structure of support section 8 of the infrared absorption section 9, and in each of FIGS. 6, 7, 8 and 9, there is shown a sectional view of the infrared detector according to this embodiment. In the drawings, a reference numeral identical with that in FIG. 10 represents an identical or corresponding portion.

For example, in the infrared detector shown in FIG. 1, the optical distance between the infrared absorption film 11 and the infrared reflection film 12 in the vicinity of the support section 8 becomes small, so that the infrared absorption efficiency is reduced. On the other hand, in order to fix the infrared absorption section 9, a bottom area of the support section 8 becomes necessary in some extent. Further, if the bottom area of the support section 8 becomes small, a thermal conduction from the infrared absorption section 9 to the heat detection section 3 becomes bad, so that it follows that a detection sensitivity for the infrared ray is lowered.

Accordingly, in this embodiment, by making a region for forming the support section 8 small, it is possible to improve the infrared absorption efficiency and to fix the infrared absorption section 9 and, additionally, the support section whose thermal conductivity is not lowered is provided.

Figure 6:
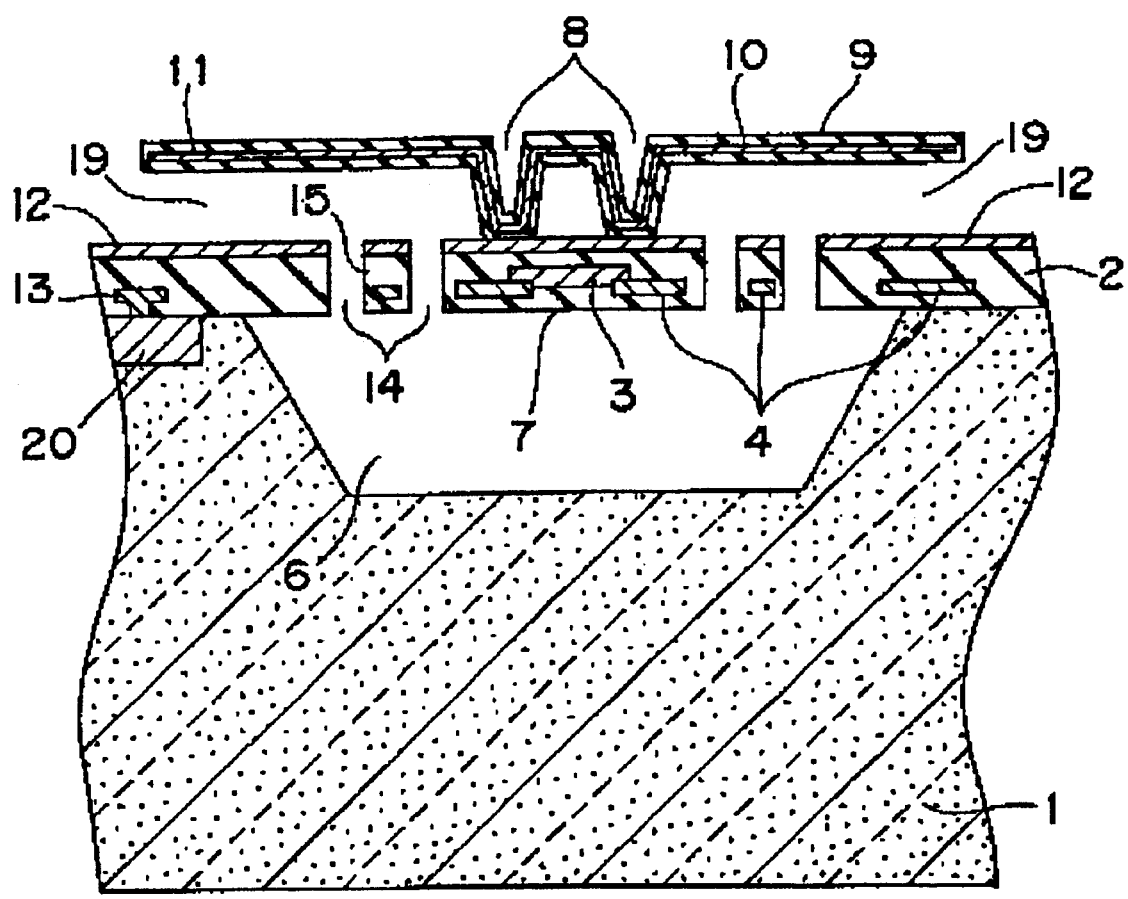
FIG. 6 is a sectional view of the infrared detector according to an embodiment 3 of the invention.

In FIG. 6, the support section 8 formed by making a part of the infrared absorption section 9 into a convex form is formed in plural number. Since the infrared absorption section 9 can be stably fixed, four support sections 8 are disposed at the locations corresponding to four corner of a rectangular area surrounding the heat detection section 3, provided that only a pair of support members 8 is shown in FIG. 6.

In this manner, by using the plural support sections 8, it is possible to reduce the bottom area of the support section 8 without bringing about a reduction in support strength of the infrared absorption section 9.

Therefore, it is possible to suppress a reduction in infrared absorption efficiency owing to the fact that the support section 8 is formed.

Further, in case where the plural support sections 8 are formed in parallel with a predetermined spacing being provided therebetween, in comparison with a case where one support section 8 is formed as in FIG. 1, the heat conduction efficiency rather becomes high in the case where the plural support sections 8 are provided even though the bottom area of the support section 8 (contact area between the support section 8 and the infrared reflection film 12) is the same. That is, a heat conduction efficiency becomes high rather in a case where the heat is conducted from each of the four support sections 8 provided while being dispersed, for example, in four directions than a case where the heat is conducted from one point.

Therefore, by using the structure of FIG. 6, it is possible to increase the heat conduction efficiency and to heighten a sensitivity of the infrared detector.

Figure 7:
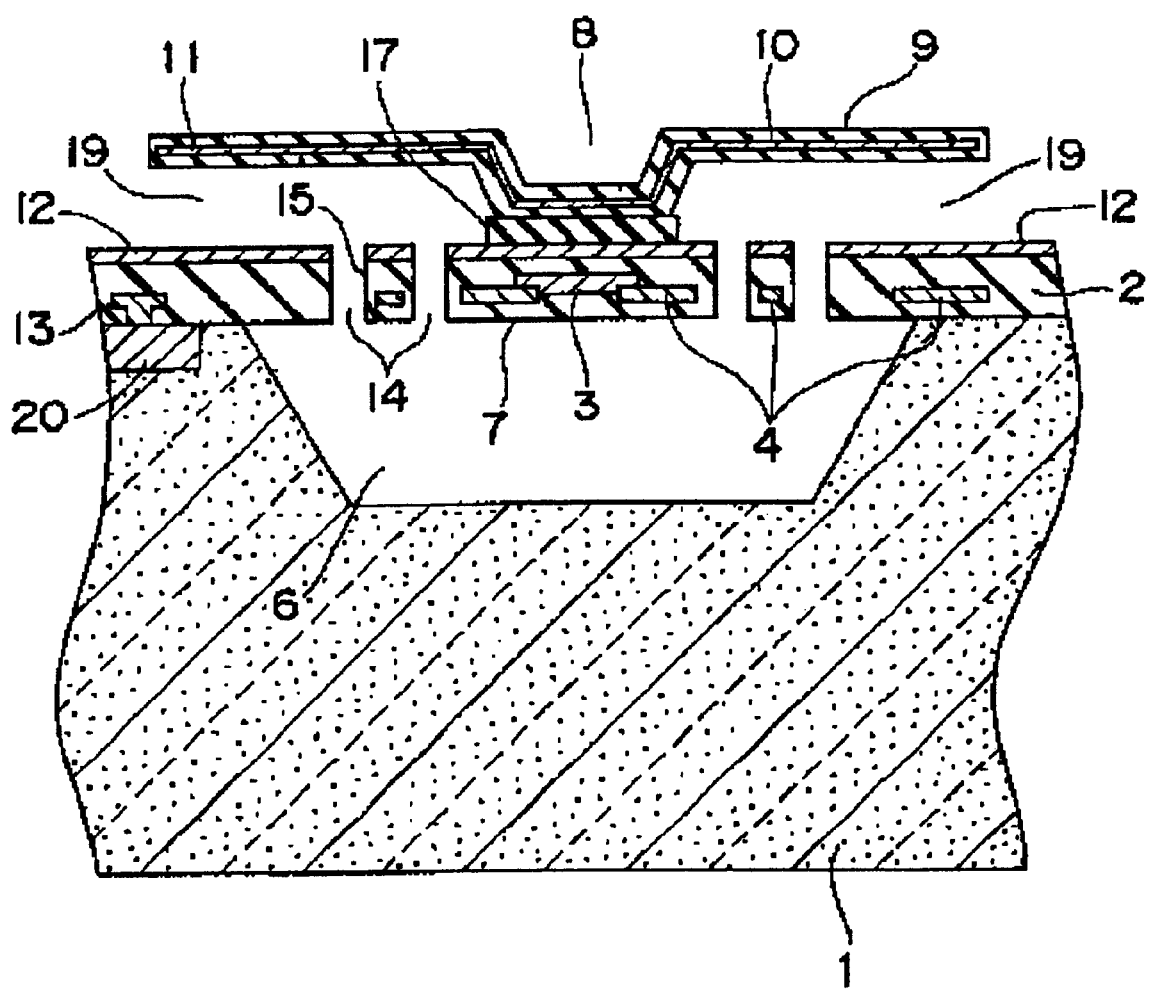
FIG. 7 is a sectional view of the infrared detector according to the embodiment 3 of the invention.

FIG. 7 shows one in which a spacer section 17 is provided between the support section 8 and the infrared reflection film 12 and, also in the support section 8, the optical distance between the infrared absorption film 11 and the infrared reflection film 12 is set to a distance of about one quarter of center wavelength of the infrared ray to be absorbed.

That is, in case where a spacing between the infrared absorption film 11 and the infrared reflection film 12 is set to about one quarter of the absorption wavelength, in the support section 8 that spacing becomes smaller than about one quarter of the absorption wavelength. However, for example, by using a material having a large refractive index as the spacer section 17, the optical distance between the infrared absorption film 11 and the infrared reflection film 12 can be set to about one quarter of center wavelength of the absorption infrared ray, thereby forming the optical cavity structure.

According to Handbook of Optical Constants of Solids (ACADEMIC PRESS, INC.), for example in case where $SiO_2$ is used for a material of the spacer section 17 and the wavelength of the infrared ray to be absorbed is 10 $\mu$m, the refractive index of $SiO_2$ film is 2.7. Accordingly, by setting a film thickness of the spacer section 17 to 0.93 $\mu$m, it is possible to obtain the optical distance of about one quarter of the infrared wavelength and to obtain the optical cavity structure also in the support section 8. That is, the optical distance is obtained by 0.93 $\mu$m×2.7 and becomes 2.5 $\mu$m, so that it becomes about one quarter of the wavelength 10 $\mu$m of the infrared ray.

By using such a structure, a reduction in infrared absorption efficiency in the support section 8 can be prevented, so that it is possible to improve the absorption efficiency of the infrared detector.

Figure 8:
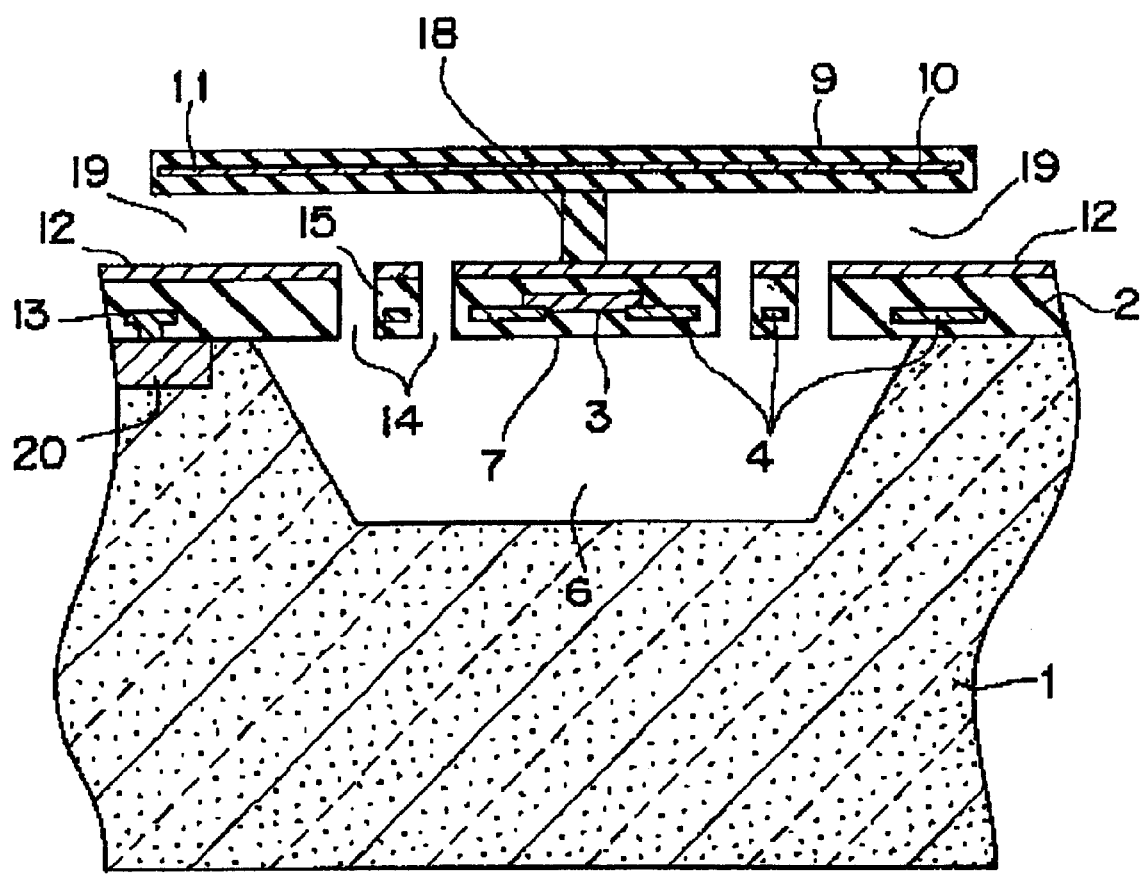
FIG. 8 is a sectional view of the infrared detector according to the embodiment 3 of the invention.

Further, FIG. 8 shows one in which the infrared absorption section 9 is made into a flat plate-like form and the infrared absorption section 9 is fixed by separately using a support member 18. For the support member 18, a heat conductive insulator such as, for example, $SiO_2$ is used. It is preferable to make the support section 18 into a cylindrical shape for instance.

By using such a structure, it is possible to prevent a reduction in absorption efficiency in the vicinity of the support section 8 in comparison with a case where the support section 8 is formed by making a part of the infrared absorption section 9 into a convex form as FIG. 1. That is, in the structure of FIG. 1, the support section 8 has a taper-like side face, and also in such a portion a reduction in absorption efficiency occurs, but in the structure of FIG. 8 the absorption efficiency is merely reduced only in a portion to which the support section 18 is joined, and a reduction in absorption efficiency scarcely occurs in the vicinity thereof.

Accordingly, even if a contact area between the support section 8 or the support member 18 and the infrared reflection film 12 is the same, a reduction in absorption efficiency can be prevented by using the structure of FIG. 8.

Figure 9:
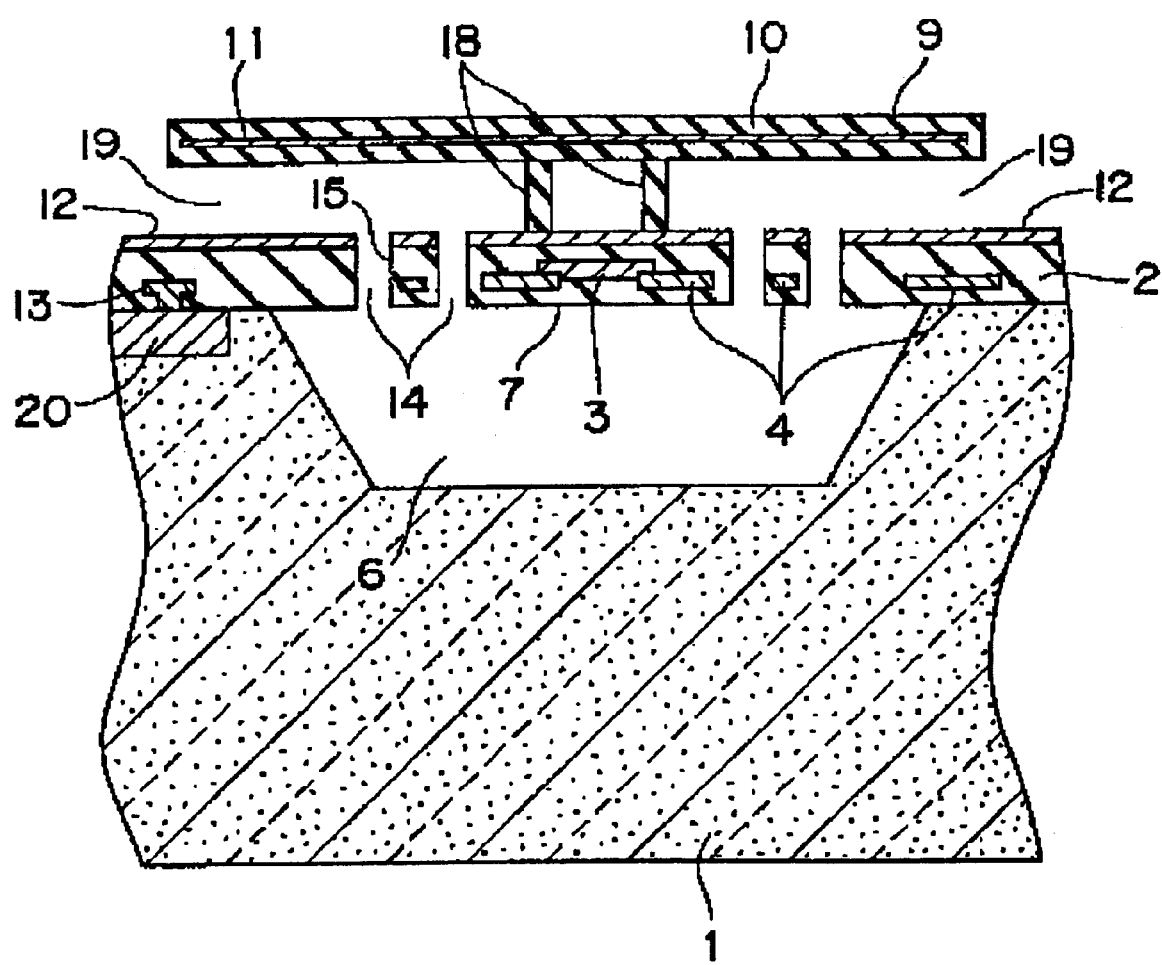
FIG. 9 is a sectional view of the infrared detector according to the embodiment 3 of the invention.

FIG. 9 shows a case where plural support members 18 of FIG. 8 are provided in parallel. Four support sections 18 are disposed at the locations corresponding to four corner of a rectangular area surrounding the heat detection section 3, provided that only a pair of support members 18 is shown in FIG. 9.

By using such a structure, similarly to the structure of FIG. 6, it is possible to improve the infrared detection efficiency without reducing a strength for fixing the infrared absorption section 9 and a heat conductivity.

Incidentally, in FIG. 6 to FIG. 9, it has been explained about a case where the support section and the support member according to this embodiment are applied to the structure according to the embodiment 1, but similarly it becomes possible to improve the infrared absorption efficiency also by applying them to the structure according to the embodiment 2.

As mentioned above, according to the invention, on improving the infrared absorption efficiency by forming the infrared reflection film, since the heat capacity of the infrared absorption section can be reduced, it is possible to obtain an infrared detector whose sensitivity is high and whose thermal time constant is low.

Further, since the infrared ray transmitting through the infrared absorption film is reflected by the infrared reflection film and then caused to come into the infrared absorption film again to be absorbed thereby, it is possible to obtain an infrared detector whose sensitivity is high.

Further, by setting the optical distance between the infrared absorption film and the infrared reflection film to about one quarter of center wavelength of the absorption infrared ray, it is possible to obtain an infrared detector whose sensitivity is high.

Furthermore, as the absorption efficiency is improved by the fact that the infrared ray is reflected in multiple times between the infrared absorption film and the infrared reflection film, it is possible to obtain an infrared detector whose sensitivity is high.

In addition, since the infrared absorption efficiency can be improved also in the support section of the infrared absorption section, it is possible to obtain an infrared detector whose sensitivity is high.

Further, by a method of manufacturing an infrared detector according to the invention, especially it is possible to easily produce an infrared detector having an optical cavity structure.

What is claimed is:

1. An infrared detector for detecting absorbed infrared rays by converting the infrared rays into heat, comprising:
  a semiconductor substrate having a surface and a heat insulation section at the surface;
  a heat detection section located in the heat insulation section;
  an infrared ray absorption film disposed substantially parallel to the surface of the semiconductor substrate; and an infrared ray reflection film supported by the semiconductor substrate and located on opposite sides of the heat detection section, wherein infrared rays transmitted through the infrared ray absorption film are reflected by the infrared ray reflection film into the infrared ray absorption film.

2. The infrared detector of claim 1, wherein an optical distance between the infrared ray absorption film and the infrared ray reflection film is about onequarter of a center wavelength of the infrared rays absorbed by the infrared ray absorption film.

3. The infrared detector of claim 1, including an electrically insulating film on the surface of the semiconductor substrate, wherein the infrared ray reflection film is located on a surface of the electrically insulating film.

4. The infrared detector of claim 1, including an electrically insulating film on the surface of the semiconductor substrate, wherein the infrared ray reflection film is located within the electrically insulating film.

5. The infrared detector of claim 4, wherein the infrared ray reflection film includes a metal layer formed simultaneously with a wiring metal layer of the infrared detector.

6. The infrared detector of claim 1, wherein the infrared absorption section including the infrared ray absorption film has a substantially plate-like shape and a support section fixing the infrared ray absorption film to the semiconductor substrate at the heat insulation section.

7. The infrared detector of claim 6, wherein the support section supports convex parts of the infrared ray absorption section.

8. The infrared detector of claim 7, including a spacer section located between the support section and the heat insulation section, and wherein an optical distance between the infrared ray absorption film in the infrared ray absorption section and the infrared ray reflection film is about one-quarter of a center wavelength of the infrared rays to be absorbed.

9. The infrared detector of claim 6, comprising a plurality of support sections.

10. The infrared detector of claim 1, wherein the infrared ray absorption film includes one material selected from the group consisting of chromium, nichrome, titanium nitride, and vanadium nitride.

11. The infrared detector of claim 1, wherein the infrared ray reflection film includes one material selected from the group consisting of aluminum, titanium, compounds of aluminum and titanium, copper, and gold.

12. A method of producing an infrared detector for detecting absorbed infrared rays by converting the infrared rays into heat, comprising:
    forming a wiring layer and a heat detection section connected to the wiring layer and supported by a semiconductor substrate;
    covering the wiring layer and the heat detection section with an insulating film;
    forming an infrared ray reflection film on the insulating film;
    forming a sacrificial film on the infrared ray reflection film, and forming an opening in the sacrificial film opposite the heat detection section;
    forming, over the sacrificial film and in the opening, an infrared ray absorption section including an infrared ray absorption film;
    removing the sacrificial film; and
    forming, opposite the heat detection section, in the semiconductor substrate, a hollow section by etching the semiconductor substrate.

13. The method of producing an infrared detector of claim 12, further comprising forming a protective insulating film between the infrared ray reflection film and the sacrificial film.

14. A method of producing an infrared detector for detecting absorbed infrared rays by converting the infrared rays into heat, comprising:
    forming a metal layer supported by a semiconductor substrate, and forming a wiring layer and an infrared ray reflection film separated from the wiring layer by patterning the metal layer;
    forming a heat detection section connected to the wiring layer, and covering the heat detection section with an insulating film;
    forming a sacrificial film on the infrared ray reflection film, and forming an opening in the sacrificial film opposite the insulating film, thereby exposing the insulating film;
    forming, on the sacrificial film and in the opening, an infrared ray absorption section including an infrared ray absorption film;
    removing the sacrificial film; and
    forming, opposite the heat detection section, in the semiconductor substrate, a hollow section by etching the semiconductor substrate.

15. The method of producing an infrared detector of claim 12, wherein the sacrificial film has a thickness selected such that an optical distance between the infrared ray reflection film and the infrared ray absorption film, sandwiching the sacrificial film, is about one quarter of a center wavelength of infrared rays to be absorbed by the infrared ray absorption film.

16. The method of producing an infrared detector of claim 14, wherein the sacrificial film has a thickness selected such that an optical distance between the infrared ray reflection film and the infrared ray absorption film, sandwiching the sacrificial film, is about one quarter of a center wavelength of infrared rays to be absorbed by the infrared ray absorption film.

17. An infrared detector for detecting absorbed infrared rays by converting the infrared rays into heat, comprising:
    a semiconductor substrate having a surface and a hollow section at the surface;
    a heat detection section opposite the hollow section;
    an infrared ray reflection film supported by the semiconductor substrate;
    a support section at the heat detection section and extending away from the semiconductor substrate;
    an infrared ray absorption film supported by the support section and spaced from the infrared ray reflection film; and
    an air layer between the infrared ray absorption film and the infrared ray reflection film so that infrared rays transmitted through the infrared ray absorption film are reflected by the infrared ray reflection film into the infrared ray absorption film through the air layer.

18. The infrared detector as claimed in claim 17, including an electrically insulating film on the surface of the semiconductor substrate, wherein the infrared ray reflection film is disposed on a surface of the electrically insulating film.

19. The infrared detector as claimed in claim 17, including an electrically insulating film on the surface of the semiconductor substrate, wherein the infrared ray reflection film is embedded within the electrically insulating film.

20. The infrared detector as claimed in claim 17, wherein the support section includes a convex portion of the infrared ray absorption film.

* * * * *